US009840418B2

(12) United States Patent
Tour et al.

(10) Patent No.: US 9,840,418 B2
(45) Date of Patent: Dec. 12, 2017

(54) PRODUCTION OF GRAPHENE NANOPLATELETS BY OXIDATIVE ANHYDROUS ACIDIC MEDIA

(71) Applicants: James M. Tour, Bellaire, TX (US); Ayrat Dimiev, Basking Ridge, NJ (US); Gabriel Ceriotti, Houston, TX (US)

(72) Inventors: James M. Tour, Bellaire, TX (US); Ayrat Dimiev, Basking Ridge, NJ (US); Gabriel Ceriotti, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 0 days.

(21) Appl. No.: 14/739,455

(22) Filed: Jun. 15, 2015

(65) Prior Publication Data

US 2015/0360956 A1    Dec. 17, 2015

Related U.S. Application Data

(60) Provisional application No. 62/012,721, filed on Jun. 16, 2014.

(51) Int. Cl.
  *C01B 31/00*    (2006.01)
  *C01B 31/04*    (2006.01)

(52) U.S. Cl.
  CPC ...... *C01B 31/0469* (2013.01); *C01B 31/0438* (2013.01); *C01B 31/0476* (2013.01);
  (Continued)

(58) Field of Classification Search
  CPC ............ C01B 31/0438; C01B 31/0446; C01B 31/0469; C01B 31/0476
  (Continued)

(56) References Cited

U.S. PATENT DOCUMENTS

| 4,091,083 A * | 5/1978 | Hirschvogel | C04B 35/536 |
|---|---|---|---|
| | | | 423/415.1 |
| 4,632,775 A * | 12/1986 | Kalnin | H01B 1/04 |
| | | | 252/502 |

(Continued)

FOREIGN PATENT DOCUMENTS

| WO | WO-2010147860 A1 | 12/2010 |
| WO | WO-2013040356 A1 | 3/2013 |
| WO | WO-2014089214 A2 | 6/2014 |

OTHER PUBLICATIONS

Kovtyukhova et al., Layer-by-Layer Assembly of Ultrathin Composite Films from Micron-Sized Graphite Oxide Sheets and Polycations, *Chem. Mater.* 1999, 11, 771-778.

(Continued)

*Primary Examiner* — Holly Le
(74) *Attorney, Agent, or Firm* — Winstead PC

(57) ABSTRACT

Methods of producing graphene nanoplatelets by exposing graphite to a medium to form a dispersion of graphite in the medium. In some embodiments, the exposing results in formation of graphene nanoplatelets from the graphite. In some embodiments, the medium includes the following components: (a) an acid; (b) a dehydrating agent; and (c) an oxidizing agent. In some embodiments, the methods of the present disclosure result in the formation of graphene nanoplatelets at a yield of more than 90%. In some embodiments, the methods of the present disclosure result in the formation of graphene nanoplatelets in bulk quantities that are more than about a 1 kg of graphene nanoplatelets. Additional embodiments of the present disclosure pertains to the formed graphene nanoplatelets. In some embodiments, the graphene nanoplatelets include a plurality of layers, such as from about 1 layer to about 100 layers.

40 Claims, 6 Drawing Sheets

(52) U.S. Cl.
CPC ..... *C01P 2004/24* (2013.01); *Y10T 428/2982* (2015.01); *Y10T 428/2991* (2015.01)

(58) Field of Classification Search
USPC .......................... 423/445 R, 448, 460, 445 B
See application file for complete search history.

(56) References Cited

U.S. PATENT DOCUMENTS

| | | | |
|---|---|---|---|
| 8,992,881 B2 | 3/2015 | Tour et al. | |
| 2006/0239891 A1 | 10/2006 | Niu et al. | |
| 2008/0128688 A1 | 6/2008 | Pan et al. | |
| 2009/0029221 A1 | 1/2009 | Goddard et al. | |
| 2010/0055458 A1 | 3/2010 | Jang et al. | |
| 2010/0056819 A1* | 3/2010 | Jang .................. | B82Y 30/00 556/478 |
| 2010/0096597 A1 | 4/2010 | Prud'Homme et al. | |
| 2010/0105834 A1* | 4/2010 | Tour .................. | B82Y 30/00 525/50 |
| 2010/0140792 A1 | 6/2010 | Haddon et al. | |
| 2010/0233067 A1 | 9/2010 | Fukuzumi et al. | |
| 2011/0017587 A1 | 1/2011 | Zhamu et al. | |
| 2011/0017955 A1 | 1/2011 | Zhamu et al. | |
| 2011/0068290 A1 | 3/2011 | Haddon et al. | |
| 2012/0063988 A1* | 3/2012 | Tour .................. | B82Y 30/00 423/415.1 |
| 2012/0197051 A1* | 8/2012 | Tour .................. | B82Y 30/00 585/26 |
| 2013/0260150 A1* | 10/2013 | Grivei ................ | C01B 31/04 428/402 |
| 2014/0037531 A1* | 2/2014 | Liu .................... | B82Y 40/00 423/415.1 |
| 2015/0057417 A1 | 2/2015 | Tour et al. | |
| 2015/0298977 A1* | 10/2015 | Yoon ................. | C01B 31/0438 204/157.43 |
| 2015/0307357 A1 | 10/2015 | Tour et al. | |

OTHER PUBLICATIONS

Hernandez et al., High-yield production of graphene by liquid-phase exfoliation of graphite. Nature Nanotech. 2008, 3, 563-568.
Qian et al., Solvothermal-assisted exfoliation exfoliation process to produce graphene with high yield and high quality. Nano Res. 2009, 2, 706-712.
Bourlinos et al., Liquid-phase exfoliation of graphite towards solubilized graphenes, Small, 2009, 5, 1841-1845.
Milner et al., Structure and morphology of charged graphene platelets in solution by small-angle neutron scattering. *J. Am. Chem. Soc.* 2012, 134, 8302-8305.
Behabtu et al., Spontaneous high-concentration dispersions and liquid crystals of graphene. Nature Nanotech. 2010, 5, 406-411.
Geng et al., Preparation of graphene relying on porphyrin exfoliation of graphite, Chem. Commun. 2010, 46, 5091-5093.
Park et al., Liquid Phase exfoliation of expanded graphene nanoplatelets using amphiphilic organic molecules. J. Coll. Interf. Sci. 2014, 417, 379-384.
An et al., Stable aqueous dispersions of noncovalently functionalized graphene from graphite and their multifunctional high-performance applications, Nano Lett. 2010, 10, 4295-4301.
Laaksonen et al., Interfacial engineering by proteins: exfoliation and functionalization of graphene by hydrophobins. Angew. Chem. Int. Ed. 2010, 49, 4946-4949.
Bourlinos et al., Aqueous-phase exfoliation of graphite in the presence of polyvinylpyrrolidone for the production of water-soluble graphenes. Solid State Commun. 2009, 149, 2172-2176.
Lotya et al., Liquid Phase Production of Graphene by Exfoliation of Graphite in surfactant/water solutions. *J. Am. Chem. Soc.* 2009, 131, 3611-3620.
Finn et al., Inkjet deposition of liquid-exfoliated graphene and MoS2 nanosheets for printed device applications. J.Mater.Chem.C, 2014, 2, 925-932.

Penicaud et al., Deconstructing graphite: graphenide solutions. *Acc. Chem. Res.* 2013, 46, 129-137.
Colemann et al., Liquid phase exfoliation of defect-free graphene. Acc. Chem. Res. 2013, 46, 14.
Paton et al., Scalable production of large quantities of defect-free few-layer graphene by shear exfoliation in liquids. *Nature Mater.* 2014, 13, 624-630.
Malik et al., High purity graphenes prepared by a chemical intercalation method. Nanoscale, 2010, 1, 2139-2143.
Eigler et al., Graphite sulphate—a precursor to graphene. *Chem. Comm.* 2015, 51, 3162-3165.
Parvez et al., Electrochemically Exfoliated Graphene as Solution-Processable, Highly Conductive Electrodes for Organic electronics. *ACS Nano*, 2013, 7, 3598-3606.
Dimiev et al., Direct, Real Time Monitoring of Stage Transitions in Graphite Intercalation Compounds. *ACS Nano*, 2013, 7, 2773-2780.
Dimiev et al., Layer-by-layer removal of graphene for device patterning, Science, 331, 1168-1172 (2011).
Dimiev et al., Pristine Graphite Oxide. *J. Am. Chem. Soc.* 2012, 134, 2815-2822.
Catheline et al., Graphene Solutions. *Chem. Comm.* 2011, 47, 5470-5472.
Dimiev et al., Reversible formation of Ammonium Persulfate—Sulfuric Acid—Graphite Intercalation Compounds and their peculiar Raman spectra, ACS Nano, 2012, 6 (9), pp. 7842-7849.
Kosynkin et al., Longitudinal unzipping of carbon nanotubes to form graphene nanoribbons, *Nature*, 458, 872-876 (2009).
Kosynkin et al., Highly Conductive Graphene Nanoribbons by Longitudinal Splitting of Carbon Nanotubes Using Potassium Vapor, *ACS Nano*, 5, 968-974 (2011).
Genorio et al., In Situ Intercalation Replacement and Selective Functionalization of Graphene Nanoribbon Stacks, *ACS Nano* 6, 4231-4240 (2012).
Huang et al., Making a field effect transistor on a single graphene nanoribbon by selective doping, Applied Physics Letters, 91.25 (2007): 253122.
Yazami, Rachid, Heike Gabrisch, and Brent Fultz. "Self-organized carbon nanostrips with a new LiC10 structure derived from carbon nanotubes." The Journal of Chemical Physics 115.23 (2001): 10585-10588.
Li, et al. "Oxygen-Driven Unzipping of Graphitic Materials." Physical Review Letters, May 5, 2006, vol. 96, pp. 1-4.
Sinitskii et al. "Kinetics of Diazonium Functionalization of Chemically Converted Graphene Nanoribbons." ACS Nano, Mar. 26, 2010, vol. 4, No. 4, pp. 1949-1954.
Sinitskii et al. "Electronic Transport in Monolayer Graphene Nanoribbons Produced by Chemical Unzipping of Carbon Nanotubes." Applied Physics Letters, Dec. 23, 2009, vol. 95, pp. 1-3.
Han et al. "Energy band-gap engineering of graphene nanoribbons." Phys. Rev. Lett. 98, 206805/1-206805/4 (2007).
Schniepp et al. "Functionalized Single Graphene Sheets Derived from Splitting Graphite Oxide." J. Phys. Chem. B 110, 8535-8539 (2006).
Chen et al. "Graphene nano-ribbon electronics." Physica E 40, 228-232 (2007).
Rollings et al. "Synthesis and characterization of atomically thin graphite films on a silicon carbide substrate." J. Phys. Chem. Solids 67, 2172-2177 (2006).
Li et al. "Chemically Derived, Ultrasmooth Graphene Nanoribbon Semiconductors." Science 319, 1229-1232 (2008).
Campos-Delgado et al. "Bulk Production of a New Form of sp2 Carbon: Crystalline Graphene Nanoribbons." Nano Lett. 8, 2773-2778 (2008).
Yang et al. "Two-dimensional graphene nanoribbons." J. Am. Chem. Soc. 130, 4216-4217 (2008).
International Search Report and Written Opinion for PCT/US2010/038368, dated Aug. 13, 2010.
International Preliminary Report on Patentability for PCT/US2010/038368, dated Dec. 29, 2011.
Cano-Marquez, Abraham G., et al., "Ex-MWNTs: Graphene Sheets and Ribbons Produced by Lithium Intercalation and Exfoliation of Carbon Nanotubes", Nano Lett., vol. 9, No. 4, 2009, pp. 1527-1533.

(56) References Cited

OTHER PUBLICATIONS

Carruthers, W., "Some Modern Methods of Organic Synthesis", 2nd. Ed., 1978, pp. 442-445.

International Search Report and Written Opinion for PCT/US2012/055414, dated Nov. 20, 2012.

Novoselov et al., Electric Field Effect in Atomically Thin Carbon Films. Science 2004, 306, 666-669.

Li et al. Large-Area Synthesis of High-Quality and Uniform Graphene Films on Copper Foils. Science 2009, 324, 1312-1314.

Yu et al., Control and Characterization of Individual Grains and Grain Boundaries in Graphene Grown by Chemical Vapour Deposition. Nat. Mater. 2011, 10, 443-449.

Hummers et al., Preparation of Graphitic Oxide. J. Am. Chem. Soc. 1958, 80, 1339-1339.

Marcano et al., Improved Synthesis of Graphene Oxide. ACS Nano 2010, 4, 4806-4814.

Stankovich et al., Synthesis of Graphene-Based Nanosheets via Chemical Reduction of Exfoliated Graphite Oxide. Carbon 2007, 45, 1558-1565.

Lee et al., One-Step Exfoliation Synthesis of Easily Soluble Graphite and Transparent Conducting Graphene Sheets. Adv. Mater. 2009, 21, 4383-4387.

Stankovich et al., Graphene-Based Composite Materials. Nature 2006, 442, 282-286.

Jiao et al., Narrow Graphene Nanoribbons from Carbon Nanotubes. Nature 2009, 458, 877-880.

Bai et al., Rational Fabrication of Graphene Nanoribbons Using a Nanowire Etch Mask. *Nano Letters* 2009, 9, 2083-2087.

Sprinkle et al., Scalable Template Growth of Graphene Nanoribbons on SiC Nature Nanotech. 2010, 5, 727-731.

Elías et al., Longitudinal Cutting of Pure and Doped Carbon Nanotubes to Form Graphitic Nanoribbons Using Metal Clusters as Nanoscalpels Nano Letters 2010, 10, 366-372.

Yu et al., Strength and Breaking Mechanism of Multiwalled Carbon Nanotubes under Tensile Load *Science* 2000, 287, 637-640.

Luo et al. Chemical Approaches toward Graphene-Based Nanomaterials and their Applications in Energy-Related Areas. Small 2012, 8(5):630-646.

Wu et al., Graphenes as Potential Material for Electronics. Chem. Rev. 2007, 107, 718-747.

Becerril et al., Evaluation of Solution-Processed Reduced Graphene Oxide Films as Transparent Conductors. *ACS Nano* 2008, 2, 463-470.

Li et al., Highly conducting graphene sheets and Langmuir-Blodgett films. Nat. Nanotechnol. 2008, 3, 538-542.

Shih et al., Bi- and Trilayer Graphene Solutions. *Nat. Nanotechnol.* 2011, 6, 439-445.

Jiao et al., Facile Synthesis of High-Quality Graphene Nanoribbons. Nat. Nanotechnol. 2010, 5, 321-325.

Wang et al., Transition-Metal-Catalyzed Unzipping of Single-Walled Carbon Nanotubes into Narrow Graphene Nanoribbons at Low Temperature. Angew. Chem. Int. Ed. 2011, 50, 1-6.

Zhu et al., Rational Design of Hybrid Graphene Films for High-Performance Transparent Electrodes. ACS Nano 2011, 5, 6472-6479.

Ericson et al., Macroscopic, Neat, Single-Walled Carbon Nanotube Fibers. Science 2004, 305, 1447-1450.

Dimiev et al., Low-Loss, High-Permittivity Composites Made from Graphene Nanoribbons. ACS App. Mater. Interfaces 2011, 3, 4657-4661.

Morelos-Gómez et al., Clean Nanotube Unzipping by Abrupt Thermal Expansion of Molecular Nitrogen: Graphene Nanoribbons with Atomically Smooth Edges ACS Nano 2012, 6, 2261-2272.

Chen et al., The Structural Evolution of Thin Multi-walled Carbon Nanotubes during Isothermal Annealing. Carbon, 2007, 45, 274-280.

\* cited by examiner

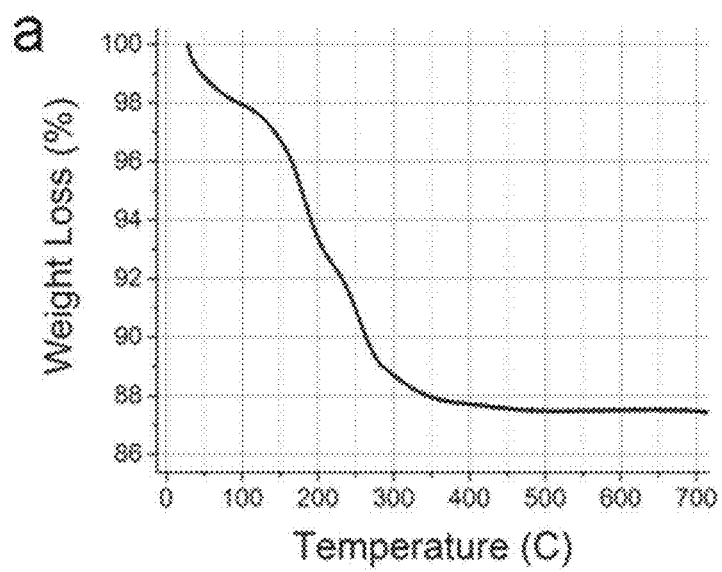
FIG. 4A
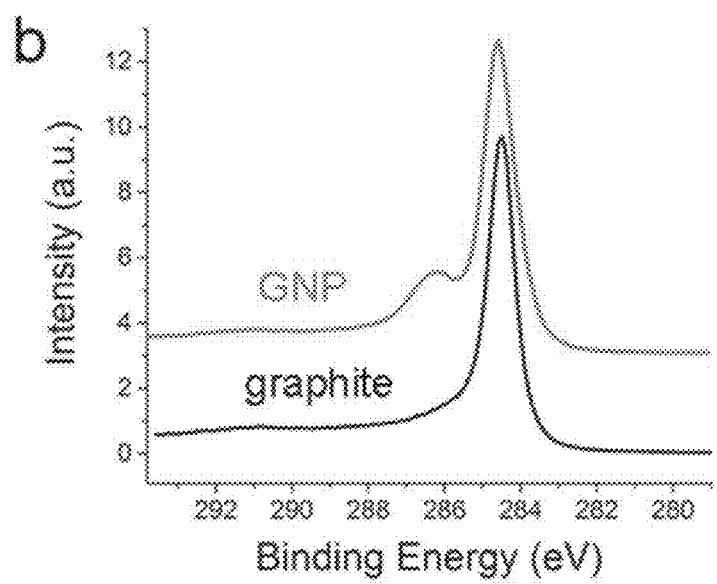
FIG. 4B
FIG. 4

PRODUCTION OF GRAPHENE NANOPLATELETS BY OXIDATIVE ANHYDROUS ACIDIC MEDIA

CROSS-REFERENCE TO RELATED APPLICATIONS

This application claims priority to U.S. Provisional Patent Application No. 62/012,721, filed on Jun. 16, 2014. The entirety of the aforementioned application is incorporated herein by reference.

STATEMENT REGARDING FEDERALLY SPONSORED RESEARCH

This invention was made with government support under Grant No. FA 9550-09-1-0581, awarded by the U.S. Department of Defense. The government has certain rights in the invention.

BACKGROUND

Current methods of producing graphene nanoplatelets (GNPs) suffer from numerous limitations, including reaction speed, reaction efficiency, multiple reaction steps, reaction safety, high costs, limited scalability, and limited GNP quality. As such, a need exists for improved methods of forming GNPs that address the aforementioned limitations.

SUMMARY

In some embodiments, the present disclosure pertains to methods of producing graphene nanoplatelets. In some embodiments, the methods include exposing graphite to a medium to form a dispersion of graphite in the medium. In some embodiments, the exposing results in the formation of graphene nanoplatelets from the graphite. In some embodiments, the methods of the present disclosure also include a step of terminating the formation of graphene nanoplatelets. In some embodiments, the terminating occurs by quenching the dispersion with a quenching agent, such as water.

In some embodiments, the medium includes the following components: (a) an acid; (b) a dehydrating agent; and (c) an oxidizing agent. In some embodiments, the acid in the medium is capable of intercalating with the graphite in the dispersion. In some embodiments, the acid includes sulfuric acid.

In some embodiments, the dehydrating agent includes, without limitation, diphosphorus pentoxide, sulfur trioxide, oleum, and combinations thereof. In some embodiments, the dehydrating agent includes oleum with a free sulfur trioxide content of about 20% by weight of the oleum. In some embodiments, the oxidizing agent includes persulfate ion-containing compounds, such as ammonium persulfate.

In some embodiments, the methods of the present disclosure result in the formation of graphene nanoplatelets at a yield of more than 90% (e.g., as high as 100%). In some embodiments, the methods of the present disclosure result in the formation of graphene nanoplatelets in bulk quantities that are more than about 1 kg of graphene nanoplatelets. In some embodiments, the methods of the present disclosure result in the complete deconstruction of graphite's interplane alignment.

In some embodiments, the present disclosure pertains to graphene nanoplatelets that are formed by the methods of the present disclosure. In some embodiments, the graphene nanoplatelets are derived from graphite, such as graphite flakes. In some embodiments, the graphene nanoplatelets include a plurality of layers. In some embodiments, the graphene nanoplatelets include from about 1 layer to about 100 layers. In some embodiments, the graphene nanoplatelets include from about 10 layers to about 50 layers.

In some embodiments, the outer layers of the graphene nanoplatelets are oxidized, and the inner layers of the graphene nanoplatelets are non-oxidized. In some embodiments, the graphene nanoplatelets are non-oxidized.

In some embodiments, the graphene nanoplatelets of the present disclosure have diameters that range from about 1 µm to about 500 µm. In some embodiments, the graphene nanoplatelets of the present disclosure have diameters that range from about 10 µm to about 100 µm. In some embodiments, the graphene nanoplatelets of the present disclosure are optically transparent.

DESCRIPTION OF THE FIGURES

FIG. 2A is a photograph of a reaction mixture with exfoliated graphite, which forms a green-yellow-colored foam. FIGS. 2B and 2C provide optical microphotographs of exfoliated graphite flakes while in the oxidative anhydrous acidic medium. FIG. 2D provides a Raman spectrum acquired from the graphite flake shown in FIG. 2C. The inset is the expansion in the 1580 $cm^{-1}$-1690 $cm^{-1}$ spectral region. The spectrum was acquired with a 514 nm laser excitation. FIG. 2E provides an X-ray powder diffraction (XRD) pattern from the green-yellow foam shown in FIG. 2A, which demonstrates that there is no orderly structure.

FIG. 4 provides data relating to the characterization of the formed GNPs. FIG. 4A provides a thermogravimetric analysis (TGA) curve of the GNPs. FIG. 4B provides a C1s X-ray photoelectron spectroscopy (XPS) spectrum of the formed GNPs and the graphite precursor.

FIG. 6A is an image that shows GNPs (left panel) obtained from 100 mg of graphite flakes (right panel). FIG. 6B provides an XRD pattern for graphite (black) and GNPs (red). FIG. 6C is an image of a conductive thin film on a membrane support made by filtering GNPs in an aqueous dispersion.

DETAILED DESCRIPTION

Figure 1:
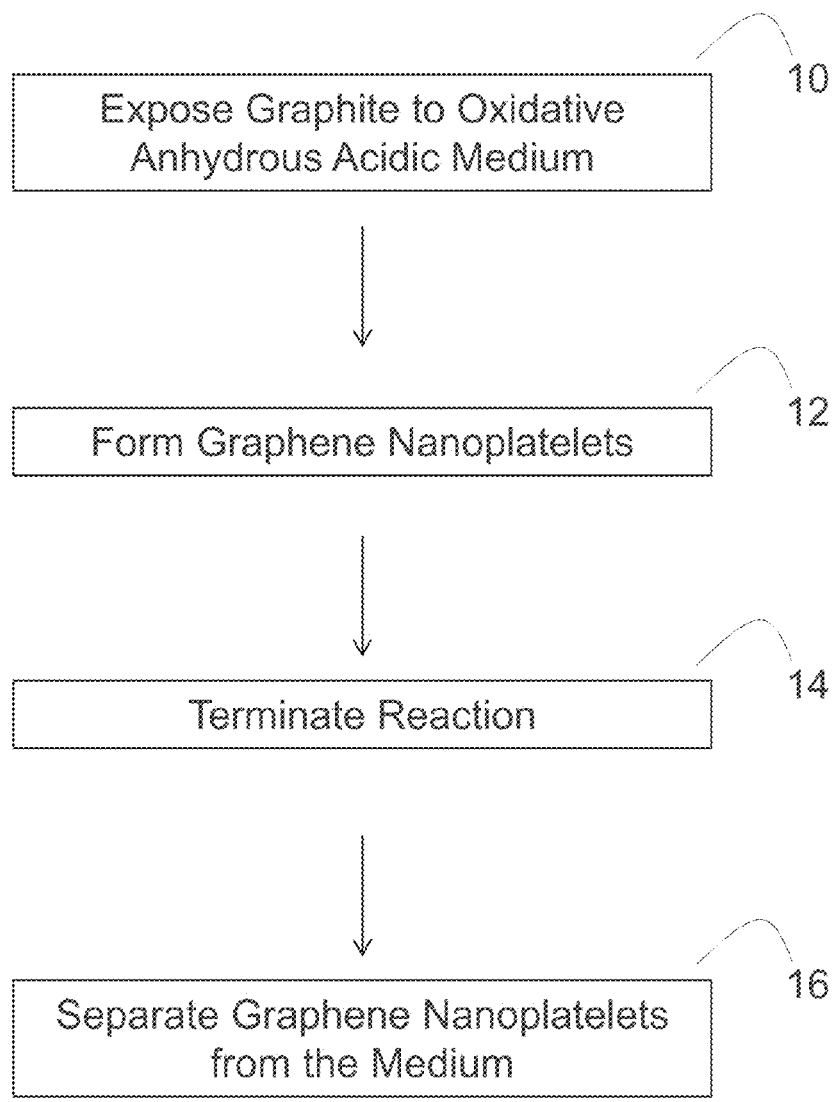
FIG. 1 provides a scheme of a method of forming graphene nanoplatelets (GNPs) by exposure of graphites to an oxidative anhydrous acidic medium (also referred to as a medium).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Due to its unique properties, graphene has become an extensively studied nanomaterial. However, successful application of graphene has been hampered by the lack of cost-effective methods for its bulk production. For instance, battery electrode materials and structural composite materials may require tons of graphenes.

To address the aforementioned challenge, the direct production of graphene from graphite by liquid phase exfoliation has gained interest. Such methods involve sonication of graphite in organic solvents or in water with surfactants. However, the degree of graphite delamination by these methods has been extremely low. Furthermore, the aforementioned methods merely focused on stabilizing exfoliated graphite in solution, not on the effectiveness of delamination.

Recently, the effectiveness of the aforementioned method was partially improved by using shear-exfoliation instead of sonication. Another approach in partially exfoliating graphite has been to first convert graphite to graphite intercalation compounds (GIC). Intercalation expands graphite and lessens adhesive forces between the constituent graphene layers. Next, the GIC is introduced into a liquid and sonicated. Despite its effective, the aforementioned method provides a low degree of delamination.

Recently, a new electrochemical method of graphite exfoliation was reported. In this method, graphite was charged negatively while being used as an electrode in electrolytic cells in dilute solutions of sulfuric acid or inorganic sulfates. While this method provides an efficient delamination of graphite, the exfoliated graphene had low oxidation levels and large lateral sizes.

Furthermore, the aforementioned methods of converting graphite to graphene provide limited yields (e.g., less than 5% or about 1%). In addition, the aforementioned methods may not be scalable in a cost-effective manner. As such, a need exists for more scalable and cost effective methods of producing graphene nanoplatelets in bulk quantities. Various aspects of the present disclosure address this need.

In some embodiments, the present disclosure pertains to improved methods of producing graphene nanoplatelets. In some embodiments that are illustrated in FIG. 1, such methods include exposing graphites to an oxidative anhydrous acidic medium (also referred to as a medium) to form a dispersion of graphites in the medium (step 10), where the exposing results in formation of graphene nanoplatelets from the graphites in the medium (step 12). In some embodiments, the methods of the present disclosure also include a step of terminating the reaction (step 14). In some embodiments, the methods of the present disclosure also include a step of separating the formed graphene nanoplatelets from the medium (step 16). Further embodiments of the present disclosure pertain to graphene nanoplatelets, such as the graphene nanoplatelets formed by the methods of the present disclosure.

As set forth in more detail herein, the methods of the present disclosure can have various embodiments. For instance, various types of graphites may be exposed to various media under various conditions to form various types of graphene nanoplatelets. Moreover, various methods may be used to terminate reactions and separate the formed graphene nanoplatelets from the anhydrous media.

Graphites

The methods of the present disclosure can utilize various types of graphites for graphene nanoplatelet formation. For instance, in some embodiments, the graphites include, without limitation, graphite flakes, graphite powders, highly ordered pyrolytic graphite (HOPG), graphite chunks, natural graphite, synthetic graphite, coal, stacks of graphene nanoribbons, and combinations thereof. In some embodiments, the graphites include graphite flakes. The use of additional graphites for graphene nanoplatelet formation can also be envisioned.

Exposing of Graphites to Media

Various methods may be utilized to expose the graphites of the present disclosure to various media. For instance, in some embodiments, the graphites may be exposed to a medium by physically adding the graphites to the medium. In some embodiments, the graphites may be exposed to a medium without sonication. In some embodiments, the graphites may be exposed to a medium without shear-mixing. In some embodiments, the graphites may be exposed to a medium by stirring a dispersion of the graphites in the medium. In some embodiments, the stirring occurs by mechanical stirring in the absence of stir bars.

The graphites of the present disclosure may be exposed to a medium at various temperatures. For instance, in some embodiments, the exposing occurs at temperatures that range from about 5° C. to about 100° C. In some embodiments, the exposing occurs at a temperature of about 100° C. In some embodiments, the exposing occurs at temperatures that range from about 5° C. to about 25° C. In some embodiments, the exposing occurs at a temperature of about 25° C. In some embodiments, the exposing occurs at room temperature. In some embodiments, the exposing occurs at a temperature of about 50° C.

The graphites of the present disclosure may be exposed to a medium for various periods of time. For instance, in some embodiments, the exposing occurs for about 1 minute to about 180 minutes. In some embodiments, the exposing occurs for about 1 minute to about 10 hours. In some embodiments, the exposing occurs for about 1 minute to about 4 hours. In some embodiments, the exposing occurs for about 1 minute to about 10 minutes. In some embodiments, the exposing occurs for about 5 minutes. In some embodiments, the graphites of the present disclosure are exposed to a medium by stirring a dispersion of the graphites in the medium for about 5 minutes at 100° C.

Media

In the present disclosure, media generally refer to mixtures of components that have oxidative, anhydrous and acidic properties. For instance, in some embodiments, the media of the present disclosure can have an anhydrous component (e.g., a dehydrating agent) that can absorb water from the medium, an acidic component (e.g., an acid) that is capable of intercalating with the graphites in the medium, and an oxidative component (e.g., an oxidizing agent) that is capable of maintaining the oxidation potential of the medium at a level that allows the graphites to form graphene nanoplatelets. In some embodiments, the media of the present disclosure form graphene nanoplatelets without oxidizing the graphene nanoplatelets.

In some embodiments, the media of the present disclosure can contain components that are capable of enhancing the electrochemical potential of the medium. In some embodiments, the media of the present disclosure contain components that are capable of enhancing the re-dox potential of the medium. In some embodiments, the media of the present disclosure are referred to as oxidative anhydrous acidic media.

In some embodiments, the media of the present disclosure include, without limitation, the following components: (1) an acid, (2) a dehydrating agent, and (3) an oxidizing agent. As set forth in more detail herein, the media of the present disclosure can include various acids, dehydrating agents, and oxidizing agents.

Acids

The media of the present disclosure can include acids that are capable of intercalating with graphites in a medium. In some embodiments, suitable acids include sulfuric acid. In some embodiments, the sulfuric acid is a commercially available sulfuric acid. In some embodiments, the sulfuric acid has a concentration ranging from about 96% to about 98%. In some embodiments, the sulfuric acid has a concentration of about 96%.

Dehydrating Agents

The media of the present disclosure can include dehydrating agents that are capable of absorbing water from a medium. In some embodiments, the dehydrating agent includes, without limitation, diphosphorus pentoxide ($P_2O_5$), sulfur trioxide ($SO_3$), oleum, and combinations thereof.

In some embodiments, the dehydrating agent includes oleum. In some embodiments, the oleum has a free sulfur trioxide ($SO_3$) content of about 20% by weight of the oleum. In some embodiments, the medium that includes oleum has a free $SO_3$ content that ranges from about 0% to about 20% by weight of the medium. In some embodiments, the medium that includes oleum has a free $SO_3$ content that ranges from about 1% to about 2% by weight of the medium. In some embodiments, the medium that includes oleum has a free $SO_3$ content of about 1.6% by weight of the medium.

Without being bound by theory, it is envisioned that, in some embodiments, free $SO_3$ contained in an oleum consumes all the free water contained in the acid component (e.g., sulfuric acid). This in turn can make the resulting medium completely anhydrous. The inclusion of additional dehydrating agents in the media of the present disclosure can also be envisioned.

Oxidizing Agents

The media of the present disclosure can include oxidizing agents that are capable of maintaining the oxidation potential of the medium at a level that allows the graphites to form graphene nanoplatelets. In some embodiments, the oxidizing agents of the present disclosure include oxidizing agents that are capable of enhancing the electrochemical potential of the media in which they are dissolved. For instance, in some embodiments, the oxidative agents of the present disclosure may be added to an acid-dehydrating agent mixture (e.g., a sulfuric acid—oleum mixture) to provide a medium with an electrochemical potential of more than about 100 mV, but less than about 400 mV (e.g., when compared to pure sulfuric acid).

In some embodiments, the oxidizing agents of the present disclosure include one or more persulfate ion-containing compounds. In some embodiments, the persulfate ion containing compounds of the present disclosure have a persulfate ion. In some embodiments, the persulfate ion in the persulfate ion-containing compounds of the present disclosure include, without limitation, dipersulfate ($S_2O_8^{2-}$), peroxymonosulfate ($SO_5^{2-}$), hydrogen dipersulfate ($HS_2O_8^-$), hydrogen peroxymonosulfate ($HSO_5^-$), peroxydisulfuric acid ($H_2S_2O_8$), peroxymonosulfuric acid ($H_2SO_5^-$), and combinations thereof.

In some embodiments, the persulfate ion-containing compounds of the present disclosure may be associated with a cation. In some embodiments, the cation in the persulfate ion-containing compounds of the present disclosure include, without limitation, ammonium, sodium, potassium, lithium, cesium, group 1 metals, group 2 metals, and combinations thereof.

In some embodiments, the oxidizing agents of the present disclosure include ammonium persulfate. In some embodiments, the oxidizing agents of the present disclosure include Oxone® ($KHSO_5$. $0.5KHSO_4$.$0.5K_2SO_4$). The inclusion of additional presulfate ion-containing compounds in the media of the present disclosure can also be envisioned.

Ratios

The media of the present disclosure can have various ratios of acids, dehydrating agents, and oxidizing agents. For instance, in some embodiments, the acid:dehydrating agent:oxidizing agent weight ratio varies from about 1:1:1 to about 50:8:8. In some embodiments, the acid:dehydrating agent:oxidizing agent weight ratio varies from about 4:4:1 to about 30:1:1. In some embodiments, the acid:dehydrating agent:oxidizing agent weight ratio varies from about 1:1:1 to about 20:2:1. In some embodiments, the acid:dehydrating agent:oxidizing agent weight ratio varies from about 10:1:1 to about 8:8:1. In some embodiments, the acid:dehydrating agent:oxidizing agent weight ratio is about 10:4:4. In some embodiments, the acid:dehydrating agent:oxidizing agent weight ratio is about 1:1:1. In some embodiments, the acid:dehydrating agent:oxidizing agent weight ratio is about 15:1:1.

In some embodiments, the acid:dehydrating agent weight ratio varies from about 1:1 to about 20:1. In some embodiments, the weight ratio of the graphites to the medium varies from about 1:200 to about 1:4. In some embodiments, the weight ratio of graphites to the medium is about 1:10. Additional weight ratios can also be envisioned.

Media with $H_2SO_4$ and Oleum

In some embodiments, the media of the present disclosure include sulfuric acid as the acid component and oleum as the dehydrating agent component. In some embodiments, the media of the present disclosure include sulfuric acid as the acid component, oleum as the dehydrating agent component, and a persulfate ion-containing compound as the oxidizing agent component. In some embodiments, the persulfate ion-containing compound includes ammonium persulfate.

In some embodiments, the oleum has a free $SO_3$ content of about 20% by weight of the oleum. In some embodiments, the medium that includes oleum has a free $SO_3$ content that ranges from about 0% (i.e. 100% sulfuric acid) to about 20% by weight of the medium. In some embodiments, the medium that includes oleum has a free $SO_3$ content that ranges from about 1% to about 2% by weight of the medium. In some embodiments, the medium that includes oleum has a free $SO_3$ content of about 1.6% by weight of the medium. In some embodiments, the ratio of the oxidizing agent to oleum in the oleum-containing media is from about 1 g to about 4 g of oxidizing agent per 10 mL of oleum. Additional ratios can also be envisioned.

Media Forms

In some embodiments, the media of the present disclosure are in the form of a solution. In some embodiments, the solution contains dissolved graphites and media components. In some embodiments, the solution is a liquid solution.

In some embodiments, the media of the present disclosure are in the form of a suspension. In some embodiments, the suspension contains suspended graphites and media components. In some embodiments, the suspension is a liquid suspension, a solid suspension, a gaseous suspension, and combinations thereof. In some embodiments, the suspension is a liquid suspension. In some embodiments, the suspension is a liquid and gaseous suspension. The use of additional media can also be envisioned.

In some embodiments, media that contain graphites and media components may have various properties that facilitate the formation of graphene nanoplatelets. For instance, in some embodiments, the media have an oxidation potential that ranges from about 50 mV to about 600 mV when compared to pure sulfuric acid (i.e. sulfuric acid with purities of more than about 96%). In some embodiments, the media have an electrochemical potential that ranges from about 50 mV to about 310 mV when compared to pure sulfuric acid. In some embodiments, the media have a re-dox potential that ranges from about 250 mV to about 350 mV when compared to pure sulfuric acid. In some embodiments, the media components of the present disclosure help provide the aforementioned properties.

Graphene Nanoplatelet Formation

Without being bound by theory, it is envisioned that graphene nanoplatelets can form from graphites by various mechanisms. In some embodiments, graphene nanoplatelets form when graphites are exposed to a medium. In some embodiments, graphene nanoplatelets form spontaneously after graphites are exposed to a medium. In some embodiments, the exposing leads to the intercalation of graphites with medium components. In some embodiments, such intercalation leads to the formation of graphene nanoplatelets from the graphites.

In some embodiments, graphene nanoplatelets form by the intercalation of graphite, the exfoliation of graphite, the expansion of graphite, the delamination of graphite, and combinations of such mechanisms. In some embodiments, the exposure of graphites to the medium results in the complete deconstruction of the graphite inter-plane alignment. In some embodiments, the deconstruction renders that graphite turbostratic in nature.

In some embodiments, graphene nanoplatelets form by delamination of graphite. In some embodiments, the delamination of graphite results in the formation of a foamy reaction mixture (E.g., FIG. 2A). In some embodiments, the foamy reaction mixture can be sonicated or otherwise mechanically treated. In some embodiments, the mechanical treatment or sonication increases the level of exfoliation of the graphites.

In some embodiments, a gas forms continuously during the dissolution of ammonium persulfate in fuming sulfuric acid during the entire course of graphite delamination. In some embodiments, the gas formation can assist in the exfoliation of graphite to form graphene nanoplatelets.

The methods of the present disclosure can be utilized to form graphene nanoplatelets in various yields. For instance, in some embodiments, the methods of the present disclosure form graphene nanoplatelets at a yield ranging from about 75% to about 100%. In some embodiments, the methods of the present disclosure form graphene nanoplatelets at a yield of more than 75%. In some embodiments, the methods of the present disclosure form graphene nanoplatelets at a yield of more than 90%. In some embodiments, the methods of the present disclosure form graphene nanoplatelets at a yield of about 100%.

The methods of the present disclosure can be utilized to form various amounts of graphene nanoplatelets. For instance, in some embodiments, the methods of the present disclosure can be used to form graphene nanoplatelets in bulk quantities. In some embodiments, the bulk quantities are more than about 1 g of graphene nanoplatelets. In some embodiments, the bulk quantities are more than about 500 g of graphene nanoplatelets. In some embodiments, the bulk quantities are more than about 1 kg of graphene nanoplatelets. In some embodiments, the methods of the present disclosure can be used to form graphene nanoplatelets in bulk quantities that range from about 1 g of graphene nanoplatelets to about 10 tons of graphene nanoplatelets.

Termination of Graphene Nanoplatelet Formation

In some embodiments, the methods of the present disclosure also include a step of terminating the formation of graphene nanoplatelets. For instance, in some embodiments, the exposure time of graphites to a medium is limited in order to control the quality of graphene nanoplatelet formation. Without being bound by theory, it is envisioned that, by controlling the time of exposure of graphites to media, less oxidation is likely to occur.

In some embodiments, the exposure of graphites to a medium is terminated from about 1 minute to about 180 minutes after exposing the graphites to the medium. In some embodiments, the exposure of graphites to a medium is terminated from about 10 minutes to about 120 minutes after exposing the graphites to the medium.

In some embodiments, the exposure of graphites to a medium is terminated from about 1 minute to about 10 minutes after exposing the graphites to the medium. In some embodiments, the exposure of graphites to a medium is terminated about 10 minutes after exposing the graphites to the medium. In some embodiments, the exposure of graphites to a medium is terminated about 120 minutes after exposing the graphites to the medium.

Various methods may be utilized to terminate the formation of graphene nanoplatelets. For instance, in some embodiments, the terminating occurs by quenching a medium that contains graphites and medium components. In some embodiments, the formation of graphene nanoplatelets is quenched by addition of a quenching agent to the medium. In some embodiments, the quenching agent is water, such as ice water. In some embodiments, the graphene nanoplatelets become oxidized during quenching by the formation of covalent C—O bonds on the formed graphene nanoplatelets. In some embodiments, quenching agents other than water can be used to terminate the formation of graphene nanoplatelets.

In some embodiments, the formation of graphene nanoplatelets is terminated by separation of graphene nanoplatelets from a medium. In some embodiments such separation occurs by centrifugation of the dispersion that contains graphene nanoplatelets and medium components. In some embodiments, the separation occurs by filtration of the dispersion. Additional methods by which to terminate the formation of graphene nanoplatelets can also be envisioned.

Separation of Graphene Nanoplatelets

In some embodiments, the methods of the present disclosure also include a step of separating the formed graphene nanoplatelets from a medium. In some embodiments, the separation step may be the same step as a termination step. In some embodiments, the separation occurs by centrifugation of the dispersion. In some embodiments, the separation occurs by filtration of the dispersion. In some embodiments, the separation occurs by washing the formed graphene nanoplatelets. Additional methods by which to separate graphene nanoplatelets from a medium can also be envisioned.

In some embodiments, the medium that remains after separation of graphene nanoplatelets can be reused to prepare a new batch of graphene nanoplatelets. In some embodiments, the medium can be used multiple times to prepare multiple batches of graphene nanoplatelets.

Graphene Nanoplatelets

The methods of the present disclosure can be utilized to form various types of graphene nanoplatelets. In some embodiments, the present disclosure pertains to the graphene nanoplatelets that are formed by the methods of the present disclosure.

The graphene nanoplatelets of the present disclosure can have various structures. For instance, in some embodiments, the graphene nanoplatelets of the present disclosure are in the form of a thin film. In some embodiments, the graphene nanoplatelets of the present disclosure have a crumpled morphology. In some embodiments, the graphene nanoplatelets of the present disclosure have a flattened structure. In some embodiments, the graphene nanoplatelets of the present disclosure have a foliated structure.

The graphene nanoplatelets of the present disclosure can have various layers. For instance, in some embodiments, the graphene nanoplatelets include a single layer. In some embodiments, the graphene nanoplatelets include a plurality of layers. In some embodiments, the graphene nanoplatelets have from about 1 layer to about 100 layers. In some embodiments, the graphene nanoplatelets have from about 1 layer to about 50 layers. In some embodiments, the graphene nanoplatelets have less than about 50 layers. In some embodiments, the graphene nanoplatelets have from about 1 layer to about 4 layers. In some embodiments, the graphene nanoplatelets have from about 20 layers to about 80 layers. In some embodiments, the graphene nanoplatelets of the present disclosure lack an orderly structure between the layers.

In some embodiments, the graphene nanoplatelets are non-oxidized. In some embodiments, the non-oxidized graphene nanoplatelets have an oxygen content of less than about 5% by weight of the graphene nanoplatelets. In some embodiments, the non-oxidized graphene nanoplatelets have an oxygen content of less than about 2.5% by weight of the graphene nanoplatelets. In some embodiments where the graphene nanoplatelets have multiple layers, the outer layers of the formed graphene nanoplatelets are oxidized, and the inner layers of the formed graphene nanoplatelets are non-oxidized.

In some embodiments, the graphene nanoplatelets are un-functionalized. In some embodiments, the graphene nanoplatelets are in pristine form. In some embodiments, the graphene nanoplatelets are substantially defect-free.

The graphene nanoplatelets of the present disclosure can have various sizes. For instance, in some embodiments, the graphene nanoplatelets of the present disclosure have diameters that range from about 1 µm to about 500 µm. In some embodiments, the graphene nanoplatelets of the present disclosure have diameters that range from about 10 µm to about 100 µm. In some embodiments, the graphene nanoplatelets of the present disclosure have diameters that range from about 10 µm to about 60 µm. In some embodiments, the graphene nanoplatelets of the present disclosure have diameters of about 10 µm.

In some embodiments, the graphene nanoplatelets of the present disclosure are optically transparent. For instance, in some embodiments, the graphene nanoplatelets of the present disclosure have an optical transparency that ranges from about 30% to about 98%. In some embodiments, the graphene nanoplatelets of the present disclosure have an optical transparency that ranges from about 50% to about 98%. In some embodiments, the graphene nanoplatelets of the present disclosure have an optical transparency that ranges from about 60% to about 98%. In some embodiments, the graphene nanoplatelets of the present disclosure have an optical transparency that ranges from about 70% to about 98%. In some embodiments, the graphene nanoplatelets of the present disclosure have an optical transparency of more than about 70%. In some embodiments, the graphene nanoplatelets of the present disclosure have an optical transparency that ranges from about 75% to about 95%. In some embodiments, the graphene nanoplatelets of the present disclosure have an optical transparency that ranges from about 30% to about 99%.

In some embodiments, the graphene nanoplatelets of the present disclosure are rigid. In some embodiments, the graphene nanoplatelets of the present disclosure are flexible. In some embodiments, the graphene nanoplatelets of the present disclosure can be cut in the form of a film, such as a thin film. In some embodiments, the graphene nanoplatelets of the present disclosure can be spun into fibers. In some embodiments, the graphene nanoplatelets of the present disclosure can form discontinuous films on surfaces. In some embodiments, the graphene nanoplatelets of the present disclosure can be mixed with graphene nanoribbons on surfaces. In some embodiments, the morphologies of the graphene nanoplatelets depend on the parent graphite source.

Advantages

The present disclosure provides scalable, safe and cost effective methods of producing bulk quantities of graphene nanoplatelets in yields that approach 100%. Furthermore, the methods of the present disclosure can occur in short periods of time (e.g., 5 minutes) without requiring subsequent processing steps. For instance, in some embodiments, the methods of the present disclosure lack a reduction step after the formation of graphene nanoplatelets.

Furthermore, to the best of Applicants' knowledge, the present disclosure provides a first method by which to form bulk amounts of graphene nanoplatelets at yields that are close to 100%. Moreover, in some embodiments, the methods of the present disclosure do not require various rigid mechanical steps, such as high shear blending or sonication. As such, the methods of the present disclosure can be utilized to efficiently and consistently produce bulk amounts (e.g., kilograms or tons) of graphene nanoplatelets.

Additional Embodiments

Reference will now be made to additional embodiments of the present disclosure and experimental results that provide support for such embodiments. However, Applicants note that the disclosure below is for illustrative purposes only and is not intended to limit the scope of the claimed subject matter in any way.

Example 1. Use of a Tri-Component Acidic Solution for Mass Production of Graphene Nano Platelets In this Example, Applicants demonstrate a method for the mass production of graphene nanoplatelets (GNPs) by exfoliation of graphite flakes in a tri-component system made by the combination of ammonium persulfate ($(NH_4)_2S_2O_8$), concentrated sulfuric acid ($H_2SO_4$), and fuming sulfuric acid (also called oleum or sulfuric acid with excess sulfur trioxide ($SO_3$)). It is envisioned that the free $SO_3$ contained in the oleum consumes all the free water contained in the system, thereby making the system completely anhydrous. It is also envisioned that a certain amount of free $SO_3$ remains in the system.

The formed GNPs have tens of microns in diameter, and 10 to 50 graphene layers in stacks. The outer layers of GNPs are lightly oxidized, while the inner layers remain as intact and non-oxidized graphene. When in the liquid phase of the tri-component media, graphite completely loses its interlayer registry. The use of this system affords efficient delamination and exfoliation of graphite to produce GNPs at a 100% yield.

In this Example, Applicants will use the term "sulfuric acid" to refer to commercially available concentrated (96-98%) sulfuric acid. Applicants will also use the term "oleum" to refer to commercially available oleum containing 20 wt % of free $SO_3$. Applicants will also use the term "fuming sulfuric acid" to refer to a solution that combines commercial sulfuric acid with commercial oleum, where some excess $SO_3$ remains.

Without being bound by theory, it is envisioned that conversion of graphite to GNPs begins in this Example with the formation of the stage-1 graphite intercalation compound (GIC). The GIC can be considered as an intermediate product.

Formation of the stage-1 GIC is manifested by the characteristic deep-blue color acquired by the graphite flakes in 3 to 5 minutes after introducing 100 mg of graphite into 8 ml of the tri-component mixture. All the characteristics of this intermediate GIC are exactly the same as for the GIC obtained with the use of a two-component system that contains $(NH_4)_2S_2O_8$ and $H_2SO_4$ system.

In about 1 hour after the beginning of the reaction, the deep-blue color of the stage-1 GIC turned into a green-yellow color. Thereafter, graphite flakes began to expand and delaminate. After about 2 to 3 hours, no particulate matter or liquid was distinguishable by eye in the reaction mixture. Instead, the reaction mixture turned into a uniform foam with a dark-green-yellow color. The volume of the foam was 2 to 3 times higher than the volume of the tri-component solution used for the reaction.

Figure 2:
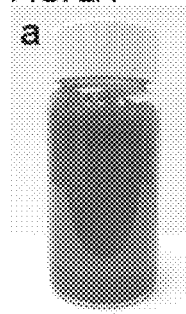
FIG. 2 provides data and images that pertain to the formation of GNPs by exfoliation of graphite in a medium that contains concentrated sulfuric acid, oleum and ammonium persulfate.
Figure 2:
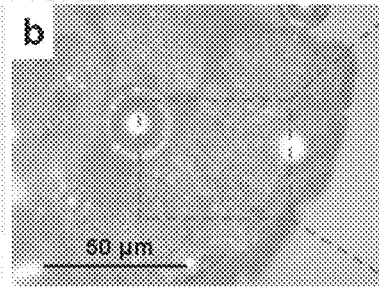
Figure 2:
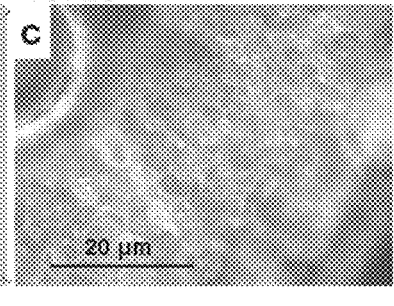
Figure 2:
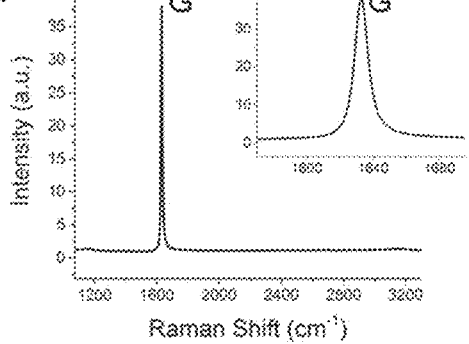
Figure 2:
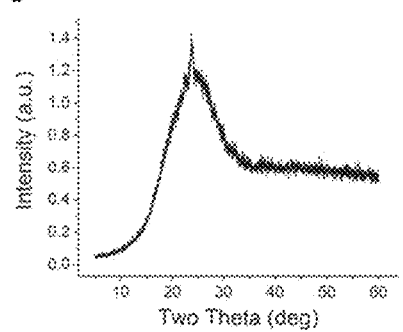

FIG. 2A shows an image of the formed foam. Formation of such uniform foam suggests efficient delamination of graphite flakes.

Next, Applicants investigated the formed foam by optical microscopy and Raman spectroscopy with the use of a previously developed microcell. See ACS Nano, 2013, 7, 2773-2780. The optical microscopic image reveals that the foam consists of a colorless liquid, GNPs and gas bubbles. As shown in FIG. 2B, the GNPs have a green-yellow (i.e., yellowish) color in reflected light. At a higher magnification shown in FIG. 2C, the GNP surface is not uniform. The green-yellow-colored field is alternated with light-blue-colored patches. However, the light-blue color is different from the deep-blue color of the stage-1 GIC. Moreover, the patchy structure of the GNP surface is indicative of the difference in the optical density of different GNP areas, which in turn is caused by a different degree of delamination within the same GNP. Nonetheless, the results suggest that GNPs retain their integrity as multi-layered flakes (FIGS. 2B-C) without an orderly structure between the constituent graphene layers.

As shown in FIG. 2D, the Raman spectra acquired from the light-blue-colored and from the green-yellow-colored areas of the GNP are identical to each other and similar to the spectrum of the stage-1 GIC. This spectrum contains a single feature: the G-peak at 1635 $cm^{-1}$. The G-band is blue-shifted due to charging of graphene layers by the acidic mixture. In addition, the G-band is enhanced due to the elimination of destructive interference at laser energies in the vicinity of the double Fermi energy. Without being bound by theory, it is envisioned that the 2D-band is most likely suppressed by the "Pauli blocking" effect.

The Raman spectrum typical for stage-1 GIC is anticipated for delaminated GNPs. After exfoliation, the graphene layers are still in intimate contact with the acidic mixture, which in turn charges the graphene layers. The XRD analysis made on the green-yellow foam (FIG. 2E) did not reveal any diffraction patterns.

The broad loop in the 15°-25° two theta angle area in FIG. 2E is indicative of an amorphous phase rather than an orderly structure. The sharp low intensity peak at the 24.2° two theta angle area (protruding from the loop in FIG. 2E) can be attributed to the 003 signal of the stage-2 GIC. At the reaction conditions, the stage-2 GIC may only be produced by deintercalation of the stage-1 GIC when exposing the latter to ambient conditions during the analysis. The presence of the residual stage-1 GIC in turn suggests that traces of it remained in the reaction mixture. However, based on the extremely low intensity of this signal, one can conclude that the content of the stage-1 GIC in the reaction mixture was negligible. Thus, complete deconstruction of graphite in the c-axis direction is achieved.

To isolate GNPs from the acidic mixture, the green-yellow foam was mixed with deionized (DI) water. Next, the GNPs were washed several times with water and dried in open air. During the washing and drying procedures, GNPs retained their expanded exfoliated state.

Figure 3:
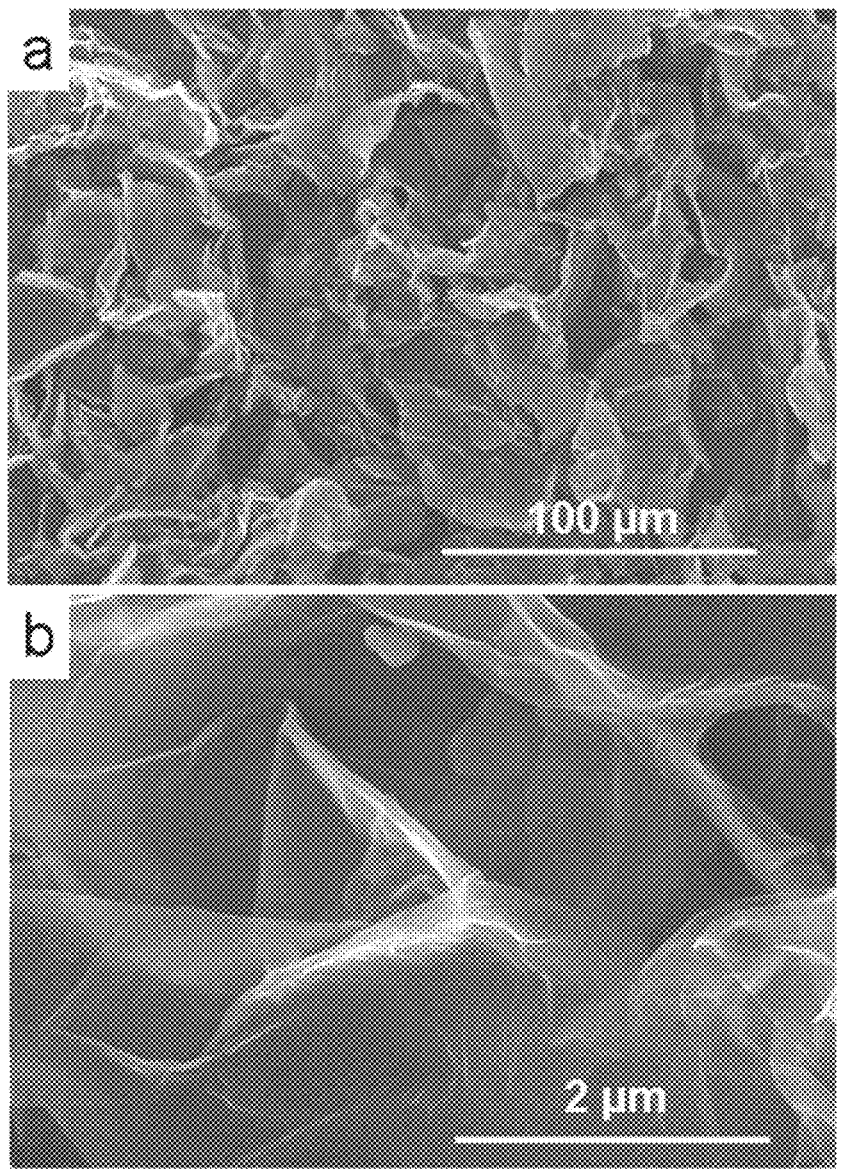
FIG. 3 provides scanning electron microscopy (SEM) images of the formed GNPs at different magnifications.

As shown in FIG. 3, the scanning electron microscopy (SEM) analysis of GNPs reveals their highly delaminated morphology. For instance, the low magnification image (FIG. 3A) shows a consistent morphology, confirming the high-yield transformation of graphite to GNPs. The GNPs have a lateral size of 10-60 μm with some up to 100 μm. All the GNPs are crumpled and wrinkled, suggesting a soft and flexible morphology.

In addition, the higher magnification image (FIG. 3B) demonstrates that GNPs are semitransparent in electron beam. This level of transparency is indicative of the thin graphitic structure of GNPs. It is estimated that the GNPs have less than 50 stacked layers (i.e., 10 to 50 stacked layers).

Next, Applicants analyzed the chemical composition of GNPs. FIG. 4A shows the thermogravimetric analysis (TGA) data. GNPs exhibit the 4.5% weight loss in the 130° C. to 200° C. temperature interval. Another 3% weight loss was observed in the 240° C. to 270° C. temperature interval. The first weight loss is typical for graphene oxide, and might be attributed to decomposition of some oxygen functionalities. This weight loss is insignificant compared to the 30% to 35% weight loss demonstrated in this temperature interval by GO, suggesting a very low oxidation level of GNPs. The second weight loss in the 240° C. to 270° C. temperature interval is not typical for GO. This weight loss may not be related to the oxidation level of GNPs. Rather, this weight loss might be attributed to the loss of trapped water and/or decomposition of organo sulfate.

As shown in FIG. 4B, the C1s X-ray photoelectron spectroscopy (XPS) spectrum of GNPs is slightly different from that of a graphite precursor. In addition to the main carbon peak at 284.5 eV, it contains a low-intensity peak at 286.4 eV, which should be attributed to the carbon atoms bounded to oxygen in the epoxides and alcohol functional groups. The survey XPS spectrum shows 86% carbon, 12% oxygen, and 2% sulfur, which is in good agreement with the TGA data. Thus, both TGA and XPS suggest a slightly oxidized nature of GNPs.

Figure 5:
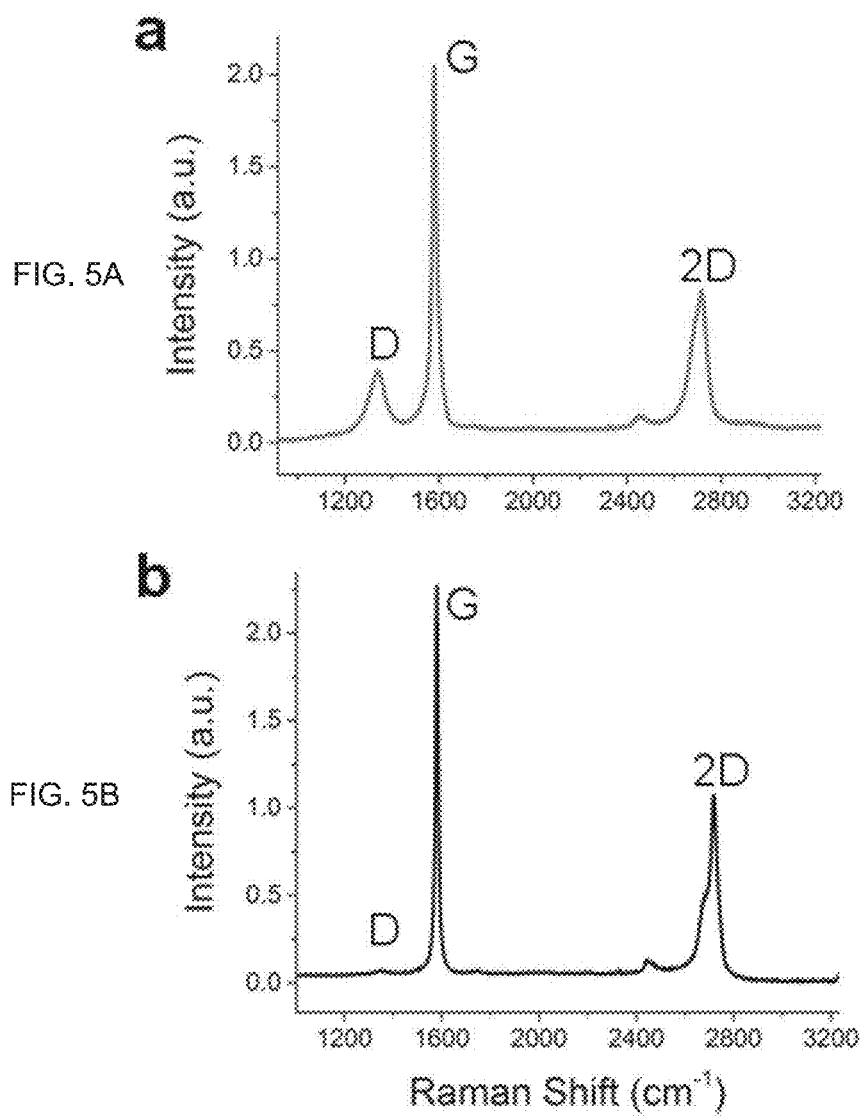
FIG. 5 provides Raman spectra of the formed GNPs (FIG. 5A) and the graphite precursor (FIG. 5B).

The Raman spectra of the GNPs and graphite precursors are shown in FIG. 5. The Raman spectrum of the GNPs (FIG. 5A) contains the D-band, which is not present in the spectrum of the graphite precursor (FIG. 5B). The full width at half maximum (FWHM) of the D-band is 90.4 cm$^{-1}$. The FWHM of the G-band is 21.3 cm$^{-1}$, which is higher than 13.5 cm$^{-1}$ for that of graphite. This type of Raman spectrum is typical for graphite, where the top graphene layer is damaged by Ar$^+$ bombardment, but the inner layers remain intact. The broad D and G bands are typical for GO. At the same time, the Raman spectrum in general looks similar to the spectrum of graphite. Thus, the Raman spectrum of the GNPs (FIG. 5A) suggests the presence of the two different phases: a GO-like phase on the GNP surface, and intact graphene inner layers.

Owing that no GO phase was detected while GNPs are still in acidic solution (FIG. 2D), one can conclude that oxidation with formation of covalent C—O bonds occurs only during quenching, when the green-yellow foam is diluted with water. Upon dilution, rapid deintercalation begins. The inner graphene layers within GNPs quickly restack and remain unoxidized. The outer layers, which are exposed to the dilute acidic mixtures, undergo oxidation.

Figure 6:
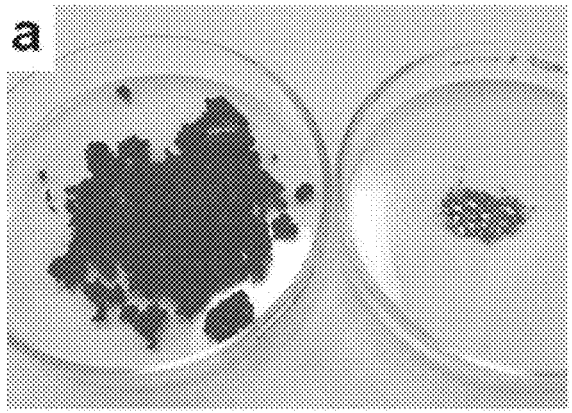
FIG. 6 provides additional data and images relating to the formed GNPs.
Figure 6:
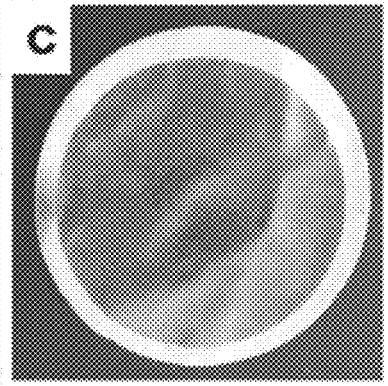
Figure 6:
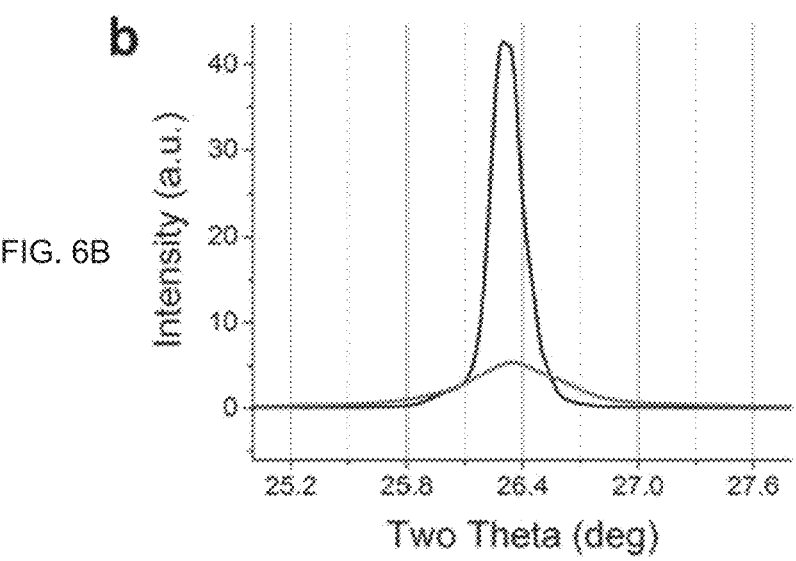

FIG. 6A is an image that compares the volume of GNPs with the volume of the graphite flake precursors that were utilized to prepare the GNPs. The image demonstrates the degree and effectiveness of graphite exfoliation.

As shown in the graph in FIG. 6B, the 002 diffraction signal of GNPs is significantly broader and weaker compared to that of graphite. This is indicative of positional disorder in GNPs caused by exfoliation and subsequent restacking of constituting graphene layers during the quenching of the green-yellow foam by water.

To determine the electrical properties of the GNPs, Applicants prepared a film by depositing GNPs on a flexible polyester membrane by filtering the GNP aqueous dispersion. FIG. 6C demonstrates that a thin uniform film was formed on the membrane surface. The film sheet resistance was 23.4±4.3 Ohm/sq, confirming high conductivity of GNPs.

Applicants have also improved the method in this Example by using elevated temperatures during exfoliation. The time needed for exfoliation rapidly decreases when the temperature is increased. At 120° C., the graphite delamination is achieved within 10 minutes. Importantly, the tri-component solution contains only environmentally friendly components. No toxic fumes and no heavy metals are involved or generated during the reaction. The solution contains only H, O, S, and N. After the reaction, the diluted solution and washing waters can be neutralized and turned into ammonium sulfate. Alternatively, the used solution can be re-generated by addition of new portions of $SO_3$ and $(NH_4)_2S_2O_8$ and reused to prepare a new batch of GNPs.

To summarize, Applicants have demonstrated in this Example a new and highly efficient method for the bulk production of lightly oxidized, large lateral size GNPs that include from about 10 graphene layers to about 50 graphene layers. Applicants have observed that, in the tri-component media, graphite completely loses its interlayer registry. This allows potential development of a new work-up protocol to obtain single layer graphene with 100% yield. Moreover, no mechanical action such as sonication or shear-mixing was necessary. Rather, the reaction occurred spontaneously within 1.5 to 4 hours after exposing graphite to the tri-component solution.

Example 1.1. Methods

To prepare the GNPs, 4 mL of fuming sulfuric acid (20% free $SO_3$) was mixed with 4 mL of 98% $H_2SO_4$. The mixture was then cooled to room temperature. Ammonium persulfate $(NH_4)_2S_2O_8$ (1.0 g) was added to the 8 mL of acid mixture with constant swirling. The mixing was accompanied by gas evolution from the partial decomposition of the persulfate anion.

After 5 minutes of stirring, graphite (100 mg) was added to the tri-component solution. Thereafter, swirling continued. The formation of the stage-1 GIC was indicated by the appearance of a deep-blue color. The formation of GNPs was indicated by disappearance of blue color, expansion of graphite flakes, and formation of a green-yellow foam. Complete exfoliation was achieved in 3 to 4 hours after the beginning of the reaction.

Next, the reaction mixture was quenched with water, filtered and washed with water until the reaction became neutral. The washed GNPs were dried in air for 1 to 2 days until constant weight was achieved. 100 mg of graphite yielded 105 mg of GNPs. The graphite starting material used was flake graphite (FG) from Sigma-Aldrich (batch #13802EH).

Optical micrographs were acquired using a Zeiss Axioplan 2, equipped with AxioCam MRc. The reflected mode was used with a white incandescent light source. Two types of lenses were used: Zeiss Epiplan 10×, 0.2 for low magnification imaging; and Zeiss LD Epiplan 20×, 0.4 HD DIC for higher magnification. The Raman spectra were acquired using a Renishaw Raman RE01 microscope with a 40× lens. The 514 nm wavelength laser were used for excitation. X-ray powder diffraction (XRD) was obtained using a Rigaku D/Max 2550 diffractometer with Cu Kα radiation ($\lambda$=1.5418 Å). The data was analyzed and processed using the Jade 9 software package. TGA was performed with a Q50 TA Instruments. Nitrogen was used as a balance purge gas and argon was used as a sample purge gas. A heating rate of 10° C./min was used. SEM images were acquired on a JEOL-6500 scanning electron microscope with a 15 kV working voltage.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of producing graphene nanoplatelets, wherein the method comprises:

exposing graphite to an anhydrous medium to form a dispersion of graphite in the medium, wherein the anhydrous medium comprises at least the following individual components:
(a) an acid,
(b) a dehydrating agent, and
(c) an oxidizing agent; and
wherein the exposing results in formation of the graphene nanoplatelets from the graphite.

2. The method of claim 1, wherein the graphite is selected from the group consisting of graphite flakes, graphite powders, highly ordered pyrolytic graphite, graphite chunks, natural graphite, synthetic graphite, coal, stacks of graphene nanoribbons, and combinations thereof.

3. The method of claim 1, wherein the graphite comprises graphite flakes.

4. The method of claim 1, wherein the exposing comprises stirring the dispersion.

5. The method of claim 1, wherein the exposing occurs at temperatures of about 5° C. to about 100° C.

6. The method of claim 1, wherein the exposing occurs at room temperature.

7. The method of claim 1, wherein the exposing occurs for about 1 minute to about 10 hours.

8. The method of claim 1, wherein the anhydrous medium comprises a solution.

9. The method of claim 1, wherein the acid is capable of intercalating with the graphite in the dispersion.

10. The method of claim 1, wherein the acid comprises sulfuric acid.

11. The method of claim 1, wherein the dehydrating agent is selected from the group consisting of oleum, sulfur trioxide, diphosphorus pentoxide and combinations thereof.

12. The method of claim 1, wherein the dehydrating agent comprises sulfur trioxide.

13. The method of claim 1, wherein the dehydrating agent comprises oleum.

14. The method of claim 13, wherein the oleum has a free sulfur trioxide content of about 20% by weight of the oleum.

15. The method of claim 13, wherein the anhydrous medium has a free sulfur trioxide content that ranges from about 0% to about 10% by weight of the anhydrous medium.

16. The method of claim 1, wherein the oxidizing agent comprises a persulfate ion-containing compound.

17. The method of claim 16, wherein the persulfate ion-containing compound comprises a persulfate ion selected from the group consisting of dipersulfate, peroxymonosulfate, hydrogen dipersulfate, hydrogen peroxymonosulfate, peroxydisulfuric acid, peroxymonosulfuric acid, and combinations thereof.

18. The method of claim 16, wherein the persulfate ion-containing compound comprises a cation selected from the group consisting of ammonium, sodium, potassium, lithium, cesium, group 1 metals, group 2 metals, and combinations thereof.

19. The method of claim 1, wherein the oxidizing agent comprises ammonium persulfate.

20. The method of claim 1, wherein the acid:dehydrating agent:oxidizing agent weight ratio varies from about 1:1:1 to about 50:8:8.

21. The method of claim 1, wherein the acid:dehydrating agent:oxidizing agent weight ratio is about 10:4:4.

22. The method of claim 1,
wherein the acid comprises sulfuric acid, and
wherein the dehydrating agent comprises oleum.

23. The method of claim 22, wherein the oleum has a free sulfur trioxide content of about 20% by weight of the oleum.

24. The method of claim 22, wherein the oxidizing agent comprises a persulfate ion-containing compound.

25. The method of claim 24, wherein the persulfate ion-containing compound comprises ammonium persulfate.

26. The method of claim 22, wherein the anhydrous medium has a free sulfur trioxide content that ranges from about 0% to about 10% by weight of the anhydrous medium.

27. The method of claim 1, further comprising a step of terminating the formation of graphene nanoplatelets.

28. The method of claim 27, wherein the terminating occurs for about 1 minute to about 180 minutes after exposing the graphite to the anhydrous medium.

29. The method of claim 27, wherein the terminating occurs by quenching the dispersion with a quenching agent.

30. The method of claim 1, wherein the method forms graphene nanoplatelets at a yield of more than 90%.

31. The method of claim 1, wherein the method forms graphene nanoplatelets at a yield of about 100%.

32. The method of claim 1, wherein the method forms graphene nanoplatelets in bulk quantities, wherein the bulk quantities are more than about 1 kg of graphene nanoplatelets.

33. The method of claim 1, wherein the method forms graphene nanoplatelets in bulk quantities, wherein the bulk quantities range from about 1 g of graphene nanoplatelets to about 10 tons of graphene nanoplatelets.

34. The method of claim 1, wherein the formed graphene nanoplatelets comprise a plurality of layers.

35. The method of claim 34, wherein the formed graphene nanoplatelets comprise from about 1 layer to about 100 layers.

36. The method of claim 34, wherein the formed graphene nanoplatelets comprise from about 10 layers to about 50 layers.

37. The method of claim 34, wherein outer layers of the formed graphene nanoplatelets are oxidized, and wherein inner layers of the formed graphene nanoplatelets are non-oxidized.

38. The method of claim 1, wherein the formed graphene nanoplatelets are non-oxidized.

39. The method of claim 38, wherein the graphene nanoplatelets have an oxygen content of less than about 5% by weight of the graphene nanoplatelets.

40. The method of claim 1, wherein the formed graphene nanoplatelets are optically transparent.

* * * * *